United States Patent Office 3,450,383
Patented June 17, 1969

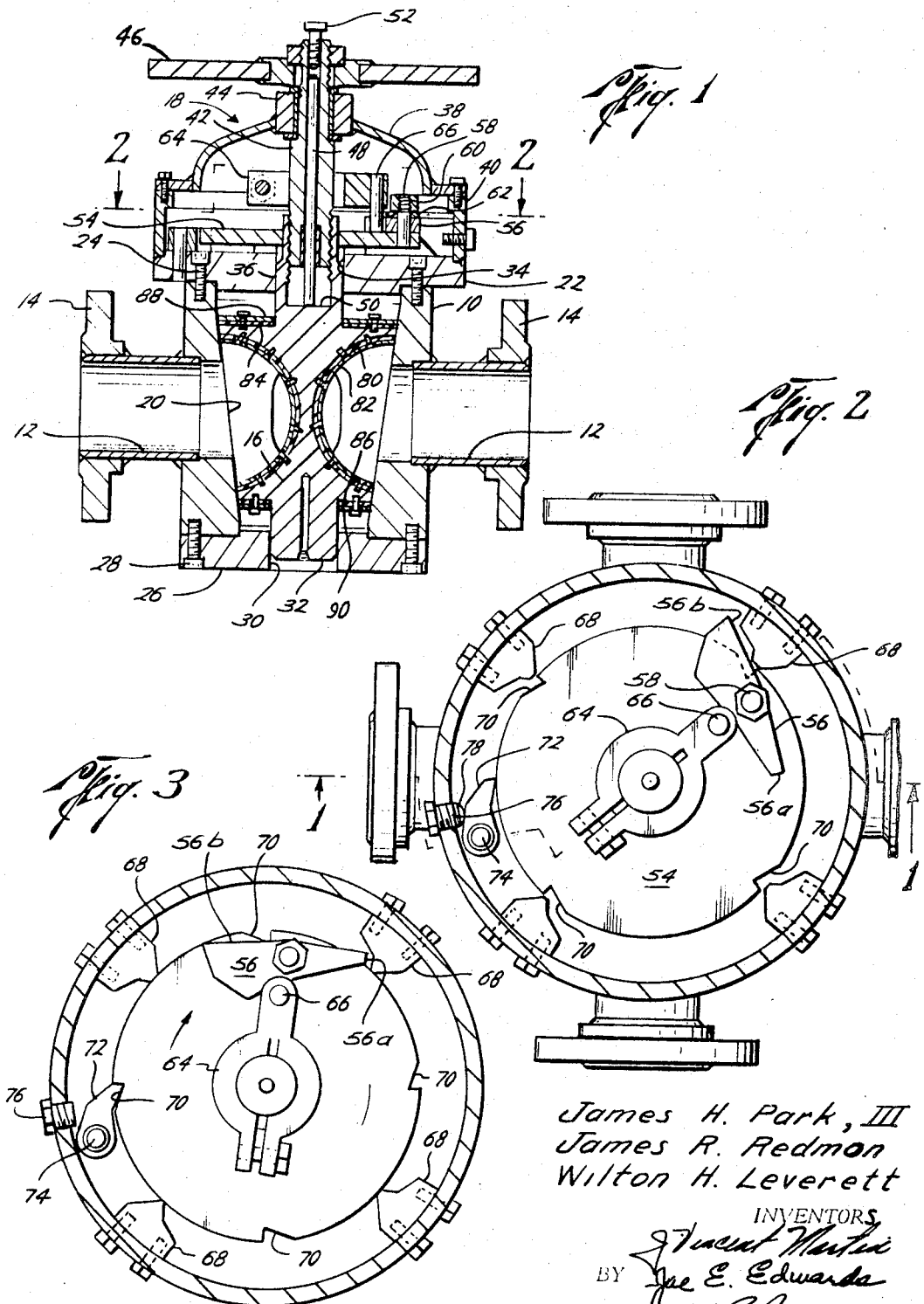

3,450,383
VALVE
James H. Park III, James R. Redmon, and Wilton H. Leverett, Houston, Tex., assignors to Maintenance Engineering Corporation, Houston, Tex., a corporation of Texas
Filed Dec. 15, 1966, Ser. No. 602,071
Int. Cl. F16k 5/02, 11/02
U.S. Cl. 251—165                                        20 Claims

ABSTRACT OF THE DISCLOSURE

A multiport plug type valve in which the plug is tapered and is provided with a plurality of layers of sealing material in sheet form. The valve also provides a plurality of releasable stop means in order that the plug may be selectively and positively positioned in any one of a number of positions.

---

The present invention relates generally to a valve having an improved valve operator and improved sealing for the valve plug.

Many plug valves and multiport valves include a tapered plug. In operating such valves, it is important that the plug be properly positioned for controlling flow. Also, the sealing of such plugs has been a problem.

It is therefore an object of the present invention to provide an improved tapered plug valve having a simple sealing arrangement with greatly extended seal life.

A further object is to provide an improved plug valve having a novel tapered plug configuration.

Another object is to provide an improved plug valve which is easily and simply actuated and positively positioned in any one of a plurality of desired positions.

Another object is to provide an improved seal for a tapered plug valve in which the sealing is easily installed on the plug in a sheet form.

Still a further object is to provide an improved operator for a tapered plug valve in which the plug is first lifted, then rotated through only a preselected portion of a revolution and thereafter reseated.

Still another another object is to provide an improved plug valve actuator having positive stops to properly position the valve plug.

A further object is to provide an improved multiport plug valve which seals effectively against substantial pressure differentials between the ports.

These and other objects and advantages of the present invention are hereinafter described and explained with reference to the preferred form of valve shown in the drawings wherein:

FIGURE 1 is a sectional view of the preferred form of the plug valve of the present invention taken along the axis of the plug.

FIGURE 2 is a view of the actuator taken along line 2—2 in FIGURE 1 showing the position of the actuator after the plug has been unseated and partially rotated.

FIGURE 3 is another similar view of the actuator showing its position after the plug has completed its rotation and remains unseated.

Referring more in detail to the drawings, the preferred form of plug valve shown includes the body 10 which defines a plurality of ports (four shown) with the pipes 12 and flanges 14 connected to body 10, the plug 16 and the actuator 18. The body 10 defines the tapered recess or chamber 20 in which the plug 16 is positioned. The plate 22 is secured to body 10 across the top of recess 20 by the bolts 24. The lower end of recess 20 is closed by the plate 26 which is secured to body 10 by the bolts 28. The plate 26 defines the centrally located hole 30 through which the lower projection 32 of plug 16 extends. Additionally, the plate 22 defines a central hole 34 through which the projection 36 of the plug 16 extends. This structure guides the longitudinal and rotational movement of plug 16.

The actuator 18 is connected both to the plug 16 and the body 10 and is adapted to initially unseat or lift the plug upwardly within the recess 20 to allow freedom of rotation of the plug 16 in the recess 20, to rotate the plug a preselected amount, e.g., exactly 90 degrees, then to stop such rotation and thereafter to seat or lower the plug in the recess 20 into seated position to assure proper sealing. The bonnet 38 is connected to the collar 40 which is secured to the upper side of the plate 22 by welding or other suitable securing means. The shaft 42 threadedly engages within the interior of the projection 36, extends through and is connected to the central portion of the bonnet by the thrust bearing assembly 44. A handle means, such as, hand wheel 46 is provided for rotating shaft 42. The central portion of shaft 42 defines a bore in which the rod 48 is positioned. The rod 48 is adapted to engage the surface 50 within the recess defined by projection 36 of the plug 16 when the plug 16 is unseated to limit the downward movement of shaft 42 within projection 36. The screw 52 threadedly engages into the bore through the shaft 42 to provide adjustment for the positioning of the rod 48 and thus an adjustment to limit the relative position of the shaft 42 within the projection 36.

A suitable means is provided for controlling the rotation of the valve plug 16. Such means includes the plate 54 which is secured to the exterior of the projection 36 of the plug 16 and is adapted to rotate therewith. The stop lever 56 is secured to the plate 54 by the threaded pin 58 and the nuts 60 with the spring washer 62 positioned between the lower surface of the nut and the upper surface of the stop lever 56 to allow the lever a limited degree of freedom of movement. The stop lever release 64 is clamped about the shaft 42 as best shown in FIGURES 2 and 3 and includes the release pin 66 depending downwardly therefrom to a position at which it may engage the stop lever 56 as hereinafter explained.

Assuming that the valve is a 4-way valve, as shown, four stops 68 are provided as a means for limiting the rotation of plug 16, each stop being secured to the interior of the collar 40 for engagement with the stop lever 56 as hereinafter explained. As shown, the stops are spaced 90 degrees apart. The exterior of the plate 54 is provided with four notches 70 which notches are adapted to be engaged by the spring loaded pawl 72 which is mounted to the plate 22 by the bolt 74. The threaded member 76 extends through the collar 40 and is adapted to be moved inwardly or outwardly to increase or decrease the force of the spring 78 on the pawl 72. The pawl 72 and notches 70 cooperate to retain plate 54 stationary while plug 16 is being seated.

The particular configuration of the plug 16 is as best illustrated in the sectional view in FIGURE 1. The plug 16 has an outer tapered contour or frusto-conical shape with a concavity formed in each side of the plug. These concavities preferably have a partial circular sectional shape. The size of the concavities should provide a sufficient flow area defined by the concave surface of the plug 16 and the wall of the recess 20 so that the flow between ports is not unduly restricted. The contour of each of these concavities should be smooth to allow the sealing means to be applied to the plug 16 as a sheet of sealing material 80. The material 80 is held in position by the backing plates 82 which have substantially the same shape as the concavity in the side of the plug. It is generally preferred that the edges of the sealing material 80 project slightly beyond the outer conical surface of the plug 16 and that the edges of the plates 82 terminate short of such surface so that the edges of the sheets will seal against the walls of recess 20. As shown, suitable fastening means secure the plates 82 and the sealing material 80 to the plug 16. Additionally, annular sealing sheets 84 and 86 are provided for sealing the upper and lower ends of plug 16 around projections 36 and 32, respectively, and are secured to the plug 16 by the backing plates 88 and 90 and the screws 92. Sealing sheets 84 and 86 have their outer edges extending beyond the tapered surface of plug 16 for sealing against the walls of recess 20. Sheets 84 and 86 have their edges in sealing engagement with the walls of chamber 20 above and below the ports in body 10.

In operation, the valve of the present invention is designed to control the direction of flow between the four ports. For example, in one position, the valve allows flow between the left and upper ports as shown in FIGURE 2, and at the same time provides communication between the lower and right ports. When the valve is moved, the communication is provided between the lower and left ports and the upper and right ports.

When the valve is to be moved from one position to another position, such movement is accomplished by simply rotating the hand wheel 46 to the right or clockwise, as viewed from above. Such rotation initially threads the shaft 42 downwardly into the interior of the projection 36 on the plug 16. Since the shaft 42 is prevented from moving axially by the thrust bearing 44, the plug 16 is lifted or unseated until rod 48 engages both surface 50 and screw 52 to prevent further relative rotation of shaft 42 in projection 36. The surface 56a of the stop lever 56 has been preset or moved inwardly as hereinafter explained to avoid contact with the stop 68 thereby allowing the shaft 42 to rotate. Rotation of the shaft 42 by clockwise rotation of the hand wheel 46 causes the surface 56b to come into contact with the stop 68 which moves the stop lever 56 in a counterclockwise direction around the pin 58 thereby positioning the surface 56a in position to engage the next stop 68. When the next stop 68 has been engaged, the pawl 72 has engaged in its next notch 70 in the plate 54 to prevent reverse rotation of the plate 54. In this position, the hand wheel 46 may be turned counterclockwise threading the shaft 42 outwardly in the projection 36 to seat the plug 16 in sealing engagement with the interior of the recess 20 in the body 10. This reverse rotation of the hand wheel 46 also rotates the stop lever release 64 which causes the release pin 66 to engage the inner side of the stop lever 56 to pivot the stop lever 56 in a clockwise direction thereby moving the surface 56a inwardly and thus releasing or presetting the stop lever for the next actuation of the valve.

The sheets of sealing material are preferably of a material having good sealing and wear characteristics. Sheets of polytetrafluoroethylene have been used with success and are generally preferred. The sealing of the plug with sheets has been found to be very effective in holding pressure differentials. Also, the edges of the sheets are not subject to wear or blowout as are the seals previously used.

From the foregoing description, it can be seen that the improved value structure of the present invention provides a seal for the valve plug which is long wearing and holds against pressure differentials. The seal provided is capable of sealing in difficult sealing patterns as illustrated by the plug 16. This seal is simple but effective. Also, the improved actuating means by which the valve plug movement is controlled, positively positions the valve plug in one of its desired positions when it is seated and unseats the plug before rotating the plug to limit the wear on the plug seals and to minimize the force necessary to rotate the plug. The plug configuration allows the plug to control flow through a multiport valve and allows the sealing means to be installed in sheet form on the plug for sealing with the walls of the chamber in the body.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:
1. A valve comprising:
   a valve body defining a plurality of ports and a central chamber in communication with said ports,
   a valve plug adapted to be positioned in said chamber,
   sealing means including a sheet of sealing material secured to said valve plug and having edges sealing against the walls of said chamber, and
   means for actuating said plug whereby said plug controls flow communication between said ports.
2. A valve according to claim 1, wherein
   said valve plug has a frusto-conical shape and defines at least one concave surface in its side,
   said sheet of sealing material is positioned in said concave surface and including,
   means securing said sealing material to said plug.
3. A valve according to claim 1, wherein
   said plug defines two concavities through which said ports are placed in communication,
   a sheet of sealing material secured to said plug in each of said concavities,
   the edges of said sealing sheets adapted to seal against the wall of said chamber around said concavities.
4. A valve according to claim 3, including
   a backing member for securing each of said sealing sheets in each of said concavities.
5. A valve according to claim 3, including
   a sheet of sealing material being secured to one end of said plug and adapted to seal against the walls of said chamber.
6. A valve according to claim 3, wherein said plug includes
   projections extending from each end of said plug and providing centering guides for engagement with said body,
   annular sealing sheets adapted to engage the ends of said plug around said projections, and
   means securing said sealing sheets to said plug.
7. A valve according to claim 6, wherein
   the edges of said annular sealing sheets seal against the walls of said chamber above and below said ports.
8. A valve according to claim 1, wherein said actuating means includes
   means connected to said plug and supported on said body to rotate said plug in said chamber, and
   means limiting the degree of rotation of said plug.
9. A valve according to claim 8, wherein said limiting means includes
   a plate secured to said plug,
   stop means secured to said plate, and
   stops secured to said body about said plate for engagement by said stop means.
10. A valve according to claim 9, including
    means pivotally securing said stop means to said plate, and
    means secured to said shaft and adapted to pivot said stop means out of engagement with one of said stops to preset said stop means for the next movement of said plug.
11. A valve according to claim 8, wherein said connecting means includes
    a shaft threadedly connected to said plug,
    means for turning said shaft, and
    means limiting rotation of said shaft with respect to said plug.
12. A valve according to claim 11, wherein said means limiting rotation of said shaft includes, a rod positioned in a bore defined by said shaft,
said rod extending from one end of said shaft and adapted to engage said plug to prevent said shaft from threading closer to the portion of said plug engaged by said rod.

13. A valve according to claim 12, including
a screw connected into said shaft and adapted to engage said rod to adjust the position of said rod in said bore of said shaft.

14. A valve according to claim 1, wherein said actuating means includes,
means for rotating and moving said plug axially to seat and unseat said plug.

15. A valve according to claim 1, wherein said actuating means includes,
a shaft,
means operatively connecting said shaft to said plug, and
a handle means connected to said shaft,
rotation of said shaft in one direction unseating said plug and rotating said plug,
rotation of said shaft in the opposite direction seating said plug.

16. A valve according to claim 1, wherein said actuating means includes
a shaft,
means operatively connecting said shaft to said plug,
means preventing rotation of said plug in one direction, and
means limiting rotation of said plug to a predetermined angular amount without resetting,
rotation of said shaft in one direction unseating said plug and rotating said plug said predetermined angular amount,
rotation of said shaft in the opposite direction seating said plug and resetting said rotation limiting means.

17. A multiport valve, comprising
a valve body,
said valve body defining a plug receiving recess,
a valve plug adapted to be positioned in said recess,
means connected to said plug for moving said plug in said recess,
said moving means adapted to unseat, rotate and seat said plug in said recess,
stop means limiting the degree of rotation of said plug, and
means for resetting said stop means responsive to movement of said plug other than rotation.

18. A multiport valve according to claim 17, including
a plate connected to rotate with said valve plug,
notches in said plate, and
a pawl secured to said body and adapted to engage in one of said notches in said plate whereby rotation of said plate and said plug in one direction is prevented.

19. A multiport valve according to claim 18, wherein said stop means includes
a stop lever pivotally mounted on said plate, and
stops mounted to said body at intervals around said plate,
said stop lever adapted to engage one of said stops each time said plug is rotated to terminate the plug rotation.

20. A multiport valve according to claim 19, wherein said resetting means includes
a resetting pin adapted to engage said stop lever after said plug rotation is terminated to pivot said stop lever to a position out of engagement with said stop.

References Cited

UNITED STATES PATENTS 3,333,812   8/1967   Mueller _____ 251—164

LEONARD D. CHRISTIAN, *Primary Examiner.*

U.S. Cl. X.R.

137—625.14